(12) United States Patent
Hashiguchi et al.

(10) Patent No.: US 10,177,446 B2
(45) Date of Patent: Jan. 8, 2019

(54) ANTENNA APPARATUS

(71) Applicant: SONY CORPORATION, Tokyo (JP)

(72) Inventors: Takaaki Hashiguchi, Tokyo (JP);
Osamu Kozakai, Kanagawa (JP);
Takayuki Hirabayashi, Tokyo (JP)

(73) Assignee: SONY CORPORATION, Tokyo (JP)

(*) Notice: Subject to any disclaimer, the term of this patent is extended or adjusted under 35 U.S.C. 154(b) by 45 days.

(21) Appl. No.: 15/314,750

(22) PCT Filed: Apr. 21, 2015

(86) PCT No.: PCT/JP2015/062143
§ 371 (c)(1),
(2) Date: Nov. 29, 2016

(87) PCT Pub. No.: WO2015/194254
PCT Pub. Date: Dec. 23, 2015

(65) Prior Publication Data
US 2017/0194698 A1    Jul. 6, 2017

(30) Foreign Application Priority Data
Jun. 17, 2014  (JP) .................. 2014-124027

(51) Int. Cl.
*H01Q 1/24* (2006.01)
*H02J 50/20* (2016.01)
*H02J 7/02* (2016.01)
*H02J 50/70* (2016.01)
*H01Q 1/38* (2006.01)
*H01Q 1/27* (2006.01)
*H04B 1/3827* (2015.01)
*H01Q 21/28* (2006.01)
*H02J 50/80* (2016.01)
*H02J 50/27* (2016.01)

(52) U.S. Cl.
CPC ............ *H01Q 1/245* (2013.01); *H01Q 1/273* (2013.01); *H01Q 1/38* (2013.01); *H01Q 21/28* (2013.01); *H02J 7/025* (2013.01); *H02J 50/20* (2016.02); *H02J 50/27* (2016.02); *H02J 50/70* (2016.02); *H02J 50/80* (2016.02); *H04B 1/385* (2013.01); *H04B 1/3838* (2013.01)

(58) Field of Classification Search
CPC ....................................... H01Q 1/38
See application file for complete search history.

(56) References Cited

U.S. PATENT DOCUMENTS

2014/0168019 A1* 6/2014 Hirobe .................. H01Q 5/40
343/720

FOREIGN PATENT DOCUMENTS

| | | |
|---|---|---|
| JP | 06-090108 A | 3/1994 |
| JP | 2002-199077 A | 7/2002 |
| JP | 2011-130474 A | 6/2011 |
| WO | 2010/150614 A1 | 12/2010 |
| WO | 2013/065245 A1 | 5/2013 |

\* cited by examiner

*Primary Examiner* — Graham Smith
(74) *Attorney, Agent, or Firm* — Xsensus, LLP

(57) ABSTRACT

There is provided an antenna apparatus including: a magnetic sheet; a first antenna provided on one face of the magnetic sheet and used for communication; and a second antenna provided on the other face opposite to the one face of the magnetic sheet and used for wireless power transmission.

6 Claims, 5 Drawing Sheets

ANTENNA APPARATUS

CROSS REFERENCE TO RELATED APPLICATIONS

This application is a U.S. National Phase of International Patent Application No. PCT/JP2015/062143 filed on Apr. 21, 2015, which claims priority benefit of Japanese Patent Application No. JP 2014-124027 filed in the Japan Patent Office on Jun. 17, 2014. Each of the above-referenced applications is hereby incorporated herein by reference in its entirety.

TECHNICAL FIELD

The present disclosure relates to an antenna apparatus.

BACKGROUND ART

In recent years, a communication apparatus such as a smartphone and a mobile phone has been spread worldwide, and a wearable device (device which can be used while being worn by a user) such as a wristwatch-type device and a glasses-type device has been actively developed. Further, a technology relating to reduction of a specific absorption rate (SAR) has been developed. Examples of the technology relating to reduction of a SAR can include a technology disclosed in the following Patent Literature 1.

CITATION LIST

Patent Literature

Patent Literature 1: JP 2002-199077A

SUMMARY OF INVENTION

Technical Problem

For example, in order to meet the need for a smaller device and the need for waterproof performance, there is a case where a wireless power transmission function is required for the wearable device. Further, for example, it is required to reduce a SAR in the wearable device in terms of safety of a user. Under such circumstances, it is desirable to provide an antenna apparatus which can be applied to a wearable device, or the like.

The present disclosure proposes a new improved antenna apparatus which can realize efficient wireless power transmission and reduction of the SAR.

Solution to Problem

According to the present disclosure, there is provided an antenna apparatus including a magnetic sheet, a first antenna provided on one face of the magnetic sheet and used for communication, and a second antenna provided on the other face opposite to the one face of the magnetic sheet and used for wireless power transmission.

Advantageous Effects of Invention

According to the present disclosure, it is possible to realize efficient wireless power transmission and reduction of a SAR.

Note that the effects described above are not necessarily limitative. With or in the place of the above effects, there may be achieved any one of the effects described in this specification or other effects that may be grasped from this specification.

DESCRIPTION OF EMBODIMENTS

Figure 1:
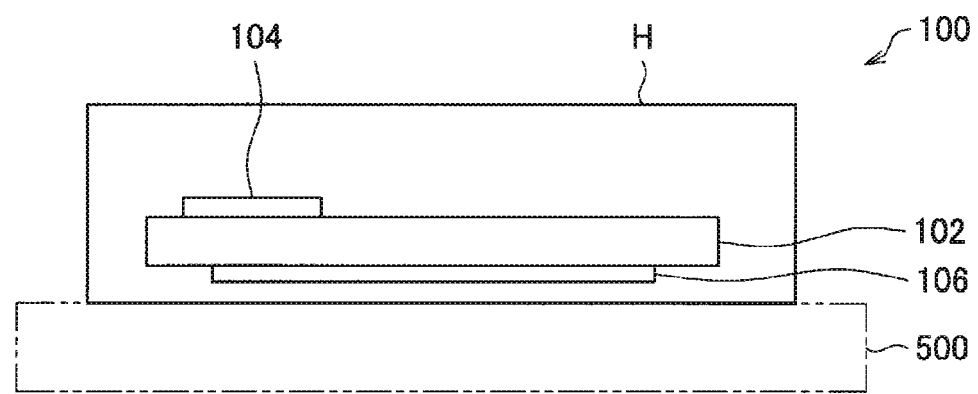
FIG. 1 is an explanatory diagram illustrating an example of a configuration of an antenna apparatus according to a first embodiment.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Further, in the following description, description will be provided in the following order:
1. Antenna apparatus according to first embodiment
2. Antenna apparatus according to second embodiment
3. Antenna apparatus according to third embodiment Further, in the following description, a case will be described as an example where an antenna apparatus according to the present embodiment is a wristwatch-type wearable device which can be used while being worn on the wrist or the arm of the user. Note that the antenna apparatus according to the present embodiment is not limited to the wristwatch-type wearable device. For example, the antenna apparatus according to the present embodiment may be an arbitrary wearable device which can be used by the user while being worn on an arbitrary portion such as the ankle and the waist. Further, the antenna apparatus according to the present embodiment can be applied to an arbitrary apparatus on which a communication function can be provided.

[1] Antenna Apparatus According to First Embodiment

FIG. 1 is an explanatory diagram illustrating an example of a configuration of an antenna apparatus 100 according to a first embodiment, and illustrates an example of cross-section of the antenna apparatus 100. In FIG. 1, an object 500 to which the antenna apparatus 100 is loaded is also illustrated. Examples of the object 500 can include a portion such as the wrist and the arm of the user, at which a user wears the antenna apparatus 100, a stand such as a charging stand, on which the antenna apparatus 100 can be placed, or the like.

The antenna apparatus 100 includes, for example, a magnetic sheet 102, a first antenna 104 (first antenna) used for communication and a second antenna 106 (second antenna) used for wireless power transmission. The magnetic sheet 102, the first antenna 104 and the second antenna 106 are stored, for example, inside a chassis H. The chassis H may have waterproof property and dust resistance.

On one face of the magnetic sheet 102, the first antenna 104 is provided by being pasted or using other methods. Further, on the other face which is an opposite face of the above-described one face of the magnetic sheet 102, the second antenna 106 is provided by being pasted or using other methods.

Here, when the antenna apparatus 100 is a wearable device, the above-described other face of the magnetic sheet 102 is a face on a user body side (in the example illustrated in FIG. 1, a face on the object 500 side) in the case where the antenna apparatus 100 is worn by the user. When the antenna apparatus 100 is a wearable device, by the other face of the magnetic sheet 102 being the face on the user body side, as will be described later, reduction of the SAR is realized by the magnetic sheet 102. Concerning the above-described other face of the magnetic sheet 102, the same also applies to antenna apparatuses according to other embodiments which will be described later.

When communication is performed at the first antenna 104 provided on one face, the magnetic sheet 102 plays a role of reducing the SAR by reducing leakage of transmission media such as radio waves, relating to communication to the other face side. Further, when wireless power transmission is performed at the second antenna 106 provided on the other face, the magnetic sheet 102 plays a role of preventing degradation of efficiency of wireless power transmission by reducing leakage of transmission media such as magnetic flux, relating to wireless power transmission, to one face side. That is, the magnetic sheet 102 functions as, for example, a shield in the antenna apparatus 100.

The magnetic sheet 102 is formed with, for example, a magnetic material such as ferrite and sendust in the sheet formed with a rubber such as a silicon rubber. Note that, the magnetic sheet 102 according to the present embodiment is not limited to the above-described sheet, and may be formed with an arbitrary material which can play a role of reducing the SAR and a role of preventing degradation of efficiency of wireless power transmission.

The first antenna 104 is, for example, configured with one antenna element or a plurality of antenna elements, and plays a role of transmitting/receiving signals. The first antenna 104 is formed with an arbitrary matter such as, for example, a metal, through which a current flows (signals propagate).

A signal received at the first antenna 104 is processed at, for example, an external apparatus connected to the antenna apparatus 100. Further, the first antenna 104, for example, transmits a signal transmitted from the above-described external apparatus.

Here, one apparatus (or component) according to the present embodiment being connected to another apparatus (or another component) refers to, for example, the one component (or component) being electrically, or physically and electrically connected to another component (or another component).

Examples of the first antenna 104 can include an antenna for long term evolution (LTE)/3G, an antenna for wireless local area network (WLAN), an antenna for communication relating to IEEE802.15.1 (hereinafter, it may be referred to as "BT"), an antenna for global positioning system (GPS), or the like. Further, the first antenna 104 may be, for example, a plurality of antennas of different communication schemes.

Figure 2:
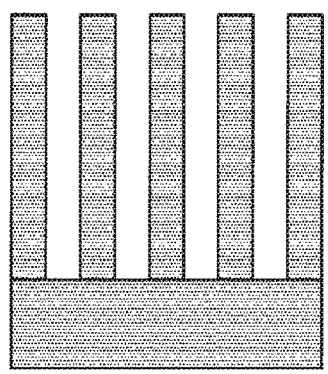
FIG. 2 is an explanatory diagram illustrating an example of a configuration of a first antenna according to the present embodiment.
Figure 2:
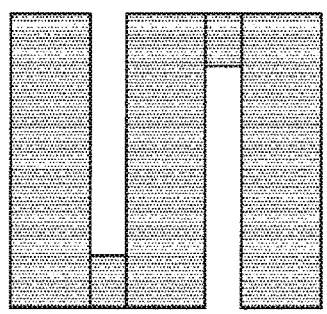
Figure 2:
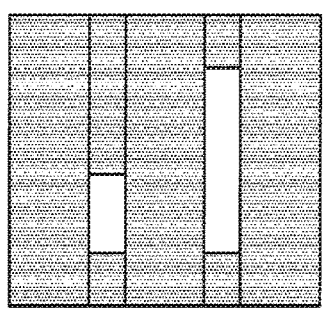
Figure 2:
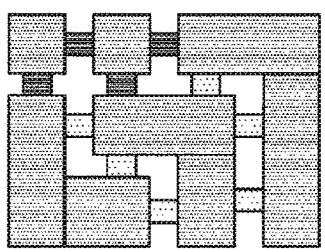

FIG. 2 is an explanatory diagram illustrating an example of a configuration of the first antenna 104 according to the present embodiment. A to D in FIG. 2 respectively illustrate examples of the configuration of the first antenna 104 in the case where the antenna apparatus 100 is viewed from the one face side (upper side in FIG. 1).

The first antenna 104 has, for example, a comb-shaped structure (A in FIG. 2) or a meander-shaped (meander type) structure (B illustrated in FIG. 2). The first antenna 104 having the comb-shaped structure or the meander-shaped structure contributes to realization of a smaller or lighter antenna apparatus 100.

Further, in the case where the antenna apparatus 100 includes the first antenna 104 having the comb-shaped structure or the meander-shaped structure, when wireless power transmission is performed at the second antenna 106, because an eddy current is less likely to flow at the first antenna 104, it is possible to reduce a possibility that a loss due to an eddy current occurs. Therefore, the first antenna 104 having the comb-shaped structure or the meander-shaped structure contributes to prevention of degradation of efficiency of wireless power transmission.

Further, the first antenna 104 has, for example, a slot-type structure (C in FIG. 2). The first antenna 104 having the slot-type structure contributes to realization of a smaller and lighter antenna apparatus 100.

Further, the first antenna 104 can have, for example, an island-shaped structure (D in FIG. 2) in which members are connected to each other with circuits. Examples of the circuits configuring the first antenna 104 having the island-shaped structure can include an LC chip, a CRLH metamaterial, or the like.

In the first antenna 104 illustrated in D in FIG. 2, an example is illustrated where members of the antenna are connected with two types of circuits of a circuit EC1 and a circuit EC2. Note that, in the first antenna 104 having the island-shaped structure, for example, the members of the antenna may be connected with one type of circuit or may be connected with three or more types of circuits.

The first antenna 104 having the island-shaped structure can provide a ground plane length suitable for each covering frequency of a multiband antenna by, for example, members of the antenna being selectively connected with the circuits. Therefore, with the antenna apparatus 100 including the first antenna 104 having the island-shaped structure, it is possible to realize communication in a wider band.

Here, selective connection between the members of the antenna in the first antenna 104 having the island-shaped structure is controlled at, for example, an external apparatus connected to the antenna apparatus 100. Further, for example, when the antenna apparatus according to the present embodiment includes an electronic component configured with one or two or more processors, various kinds of processing circuits, or the like, selective connection between the members of the antenna in the first antenna 104 having the island-shaped structure may be controlled at the electronic component.

Referring to FIG. 1 again, the configuration of the antenna apparatus 100 according to the first embodiment will be described. The second antenna 106 which is configured with one antenna element or a plurality of antenna elements, plays a role of performing wireless power transmission. The second antenna 106 is formed with an arbitrary matter such as, for example, a metal, through which a current flows (signals propagate).

Examples of the second antenna 106 can include an antenna used for non-contact power transmission which wirelessly transmits power using a magnetic field (hereinafter, it may be referred to as a "carrier") of a predetermined frequency such as 13.56 [MHz]. Specific examples of the second antenna 106 can include a loop antenna including a resonant circuit which resonates at the above-described predetermined frequency.

Note that a wireless power transmission scheme using the second antenna 106 is not limited to the above-described non-contact power transmission. For example, the second antenna 106 may be an antenna conforming to an arbitrary power transmission scheme which is capable of wirelessly transmitting power, such as an antenna conforming to a magnetic field resonance scheme and an antenna conforming to an electric field resonance scheme.

Further, when, for example, the second antenna 106 is an antenna used for non-contact power transmission, it is possible to use the second antenna 106 for near field communication (NFC) in which communication is performed using a magnetic field (carrier) of a predetermined frequency such as 13.56 [MHz], in addition to wireless power transmission. That is, the second antenna 106 according to the present embodiment may be used for wireless power transmission and communication.

A case where the second antenna 106 is an antenna used for non-contact power transmission will be described below as an example.

By an induced voltage being generated at the second antenna 106 by a carrier transmitted from an external apparatus which has a function of a reader/writer voluntarily transmitting a carrier, the antenna apparatus 100 wirelessly receives power. The power received by the second antenna 106 is, for example, transmitted to an external battery connected to the antenna apparatus 100 and stored in the external battery. Further, for example, when the antenna apparatus according to the present embodiment includes a battery, the power received by the second antenna 106 is stored in the battery. Examples of the battery according to the present embodiment can include a secondary battery, or the like.

Further, application of the second antenna 106 is not limited to power reception as described above, and the second antenna 106 may be used for power transmission. When the second antenna 106 is used for power transmission, the second antenna 106, for example, transmits a carrier according to a signal transmitted from a carrier transmission circuit provided at an external apparatus connected to the antenna apparatus 100. Further, for example, when the antenna apparatus according to the present embodiment includes a carrier transmission circuit, the second antenna 106 transmits a carrier according to a signal transmitted from the carrier transmission circuit.

The carrier transmission circuit according to the present embodiment includes, for example, a modulation circuit configured to perform modulation such as amplitude shift keying (ASK), and an amplifier circuit configured to amplify output of the modulation circuit. The carrier transmission circuit according to the present embodiment is, for example, activated by obtaining power from a battery, an external power supply, or the like. Note that the modulation circuit may be configured to be able to output, for example, a non-modulated signal. When the carrier transmission circuit according to the present embodiment has the above-described configuration, the external apparatus or the antenna apparatus according to the present embodiment including the carrier transmission circuit has an initiator function in NFC and can play a role of a so-called reader/writer.

For example, as illustrated in FIG. 1, in the antenna apparatus 100 according to the first embodiment, on the both faces of the magnetic sheet 102, the first antenna 104 used for communication and the second antenna 106 used for wireless power transmission are provided. Here, when communication is performed at the first antenna 104, the magnetic sheet 102 plays a role of reducing the SAR by reducing leakage of transmission media such as radio waves, relating to communication to the other face side. Further, when wireless power transmission is performed at the second antenna 106, the magnetic sheet 102 plays a role of preventing degradation of efficiency of wireless power transmission by reducing leakage of transmission media relating to wireless power transmission to the one face side.

Therefore, for example, according to the configuration illustrated in FIG. 1, the antenna apparatus 100 can realize efficient wireless power transmission and reduction of the SAR.

Further, for example, as illustrated in FIG. 1, by the first antenna 104 used for communication and the second antenna 106 used for wireless power transmission being provided on the both faces of the magnetic sheet 102, the antenna used for communication and the antenna used for wireless power transmission can be regarded as an integrated antenna. Therefore, for example, as illustrated in FIG. 1, by the first antenna 104 used for communication and the second antenna 106 used for wireless power transmission being provided on the both faces of the magnetic sheet 102, it is possible to realize a smaller antenna apparatus 100.

Note that the configuration of the antenna apparatus according to the first embodiment is not limited to the configuration illustrated in FIG. 1.

For example, while a case has been described above where the second antenna 106 can be further used for communication in the antenna apparatus 100, the antenna apparatus according to the first embodiment may further include a third antenna which is provided on the other face of the magnetic sheet and which is used for communication.

Examples of the third antenna can include an antenna relating to NFC, such as a loop antenna. Further, the third antenna may be, for example, an antenna conforming to an arbitrary communication scheme in which influence on the user is allowable in terms of the SAR at a manufacturer of the antenna apparatus according to the first embodiment.

Note that the configuration of the antenna apparatus according to the present embodiment is not limited to the antenna apparatus according to the above-described first embodiment (including a modified example. The same also applies to the following description). Another example of the configuration of the antenna apparatus according to the present embodiment will be described below. Note that, in the following description, a configuration different from that of the antenna apparatus according to the above-described first embodiment will be mainly described assuming the configuration of the antenna apparatus according to the above-described first embodiment.

[2] Antenna Apparatus According to Second Embodiment

Figure 3:
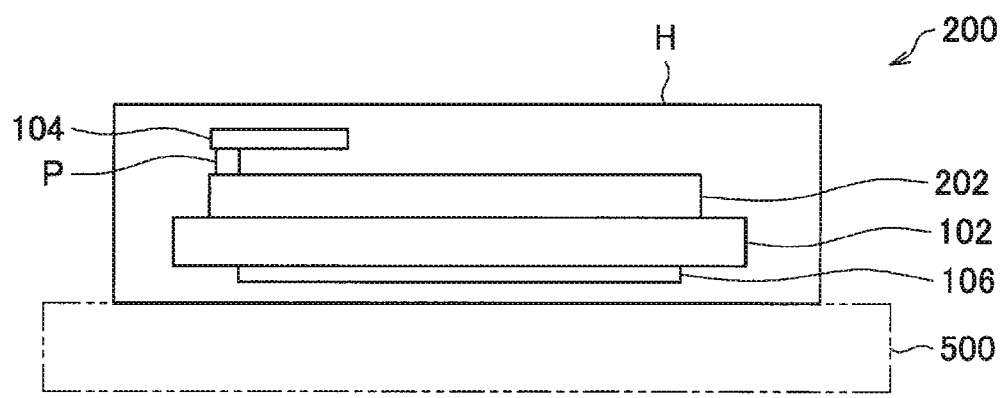
FIG. 3 is an explanatory diagram illustrating an example of a configuration of an antenna apparatus according to a second embodiment.

FIG. 3 is an explanatory diagram illustrating an example of a configuration of an antenna apparatus 200 according to a second embodiment, and illustrates an example of cross-section of the antenna apparatus 200. In FIG. 3, an object 500 to which the antenna apparatus 200 is loaded is also illustrated.

In the antenna apparatus 200, for example, a metal member 202 is further provided on one face of the magnetic sheet 102 by being pasted or using other methods.

In the antenna apparatus 200 in which the metal member 202 is provided, for example, as illustrated in P in FIG. 3, the first antenna 104 is provided on one face side of the magnetic sheet 102 while being connected to the metal member 202. The metal member 202 functions as a ground of the first antenna 104. Further, in the antenna apparatus 200 illustrated in FIG. 3, P in FIG. 3 is a power feeding point by the first antenna 104.

In the antenna apparatus 200 including the metal member 202, if wireless power transmission is performed at the second antenna 106 provided on the other face, even when leakage of transmission media relating to wireless power transmission to one face side cannot be sufficiently reduced with the magnetic sheet 102, it is possible to reduce the leakage with the metal member 202. That is, the metal member 202 functions as, for example, a shield in the antenna apparatus 200.

Therefore, the antenna apparatus 200 can further reduce leakage of transmission media relating to wireless power transmission to one face side in the case where wireless power transmission is performed at the second antenna 106 provided on the other face compared to the antenna apparatus 100 illustrated in FIG. 1.

Further, the metal member 202 plays a role of, for example, decreasing a temperature of the second antenna 106 increased by wireless power transmission being performed and decreasing a temperature of the magnetic sheet 102 on which the second antenna 106 is provided on the other face.

Examples of the metal member 202 can include a rectangular metal plate formed with a metal such as copper and aluminum. The metal plate has, for example, a thickness of approximately 0.1 [mm]. Note that the metal forming the metal plate is not limited to the above-described metals and may be an arbitrary metal which can play a role of a shield and/or a role of decreasing a temperature. Further, it goes without saying that the thickness of the metal plate is not limited to the above-described thickness.

Further, the metal member 202 is not limited to a rectangular metal plate, and, as illustrated in, for example, A to D in FIG. 2, may have a comb-shaped structure (A in FIG. 2), a meander-shaped (meander-type) structure (B in FIG. 2), a slot-type structure (C in FIG. 2) or an island-shaped structure (D in FIG. 2) in which members are connected to each other with circuits.

For example, the metal member 202 having a comb-shaped structure or a meander-shaped structure contributes to realization of a smaller and lighter antenna apparatus 200.

Further, in the case where the antenna apparatus 200 includes the metal member 202 having the comb-shaped structure or the meander-shaped structure, when wireless power transmission is performed at the second antenna 106, because an eddy current is less likely to flow at the metal member 202, it is possible to reduce a possibility that a loss due to an eddy current occurs. Therefore, the metal member 202 having the comb-shaped structure or the meander-shaped structure contributes to prevention of degradation of efficiency of wireless power transmission.

Further, the metal member 202 having the slot-type structure contributes to realization of a smaller and lighter antenna apparatus 200.

Further, the metal member 202 having the island-shaped structure, for example, can deal with a multiband antenna by the members being selectively connected to each other with the circuits. Therefore, with the antenna apparatus 200 including the metal member 202 having the island-shaped structure, it is possible to realize communication in a wider band.

Note that, while FIG. 3 illustrates a configuration including the metal member 202, the configuration of the antenna apparatus according to the second embodiment is not limited to the above-described configuration. For example, the antenna apparatus according to the second embodiment can employ a configuration where the metal member 202 is replaced with a member formed with an arbitrary matter other than a metal, which can play a role of a shield and/or a role of decreasing a temperature.

[3] Antenna Apparatus According to Third Embodiment

The configuration of the antenna apparatus according to the present embodiment is not limited to the configuration of the antenna apparatus according to the above-described first embodiment or the configuration of the antenna apparatus according to the above-described second embodiment, and may be a configuration in which, for example, other components such as the above-described electronic component and battery are further provided.

An example of the configuration of the antenna apparatus according to the third embodiment will be described below using an example where other components are further provided in the antenna apparatus according to the first embodiment. Note that the antenna apparatus according to the third embodiment can employ a configuration where other components are further provided in the antenna apparatus according to the second embodiment.

Figure 4:
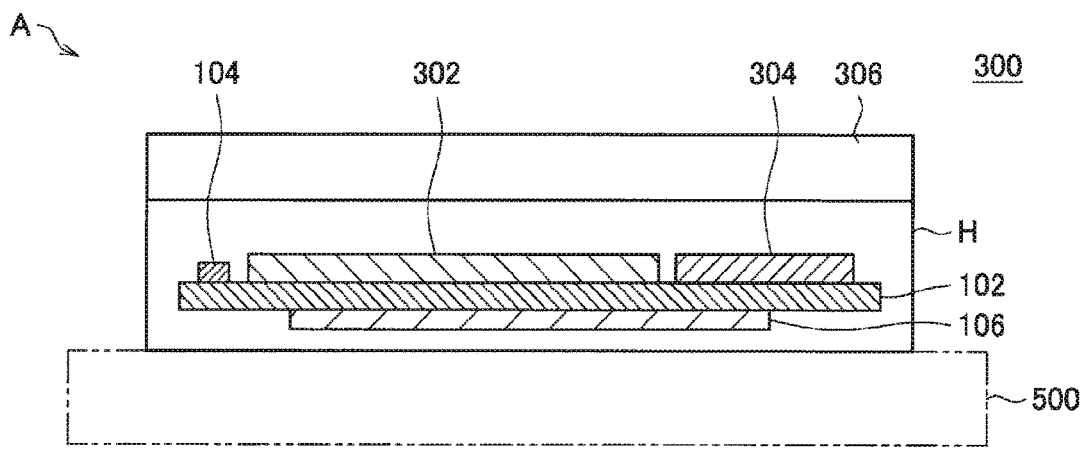
FIG. 4 is an explanatory diagram illustrating an example of a configuration of an antenna apparatus according to the third embodiment.
Figure 4:
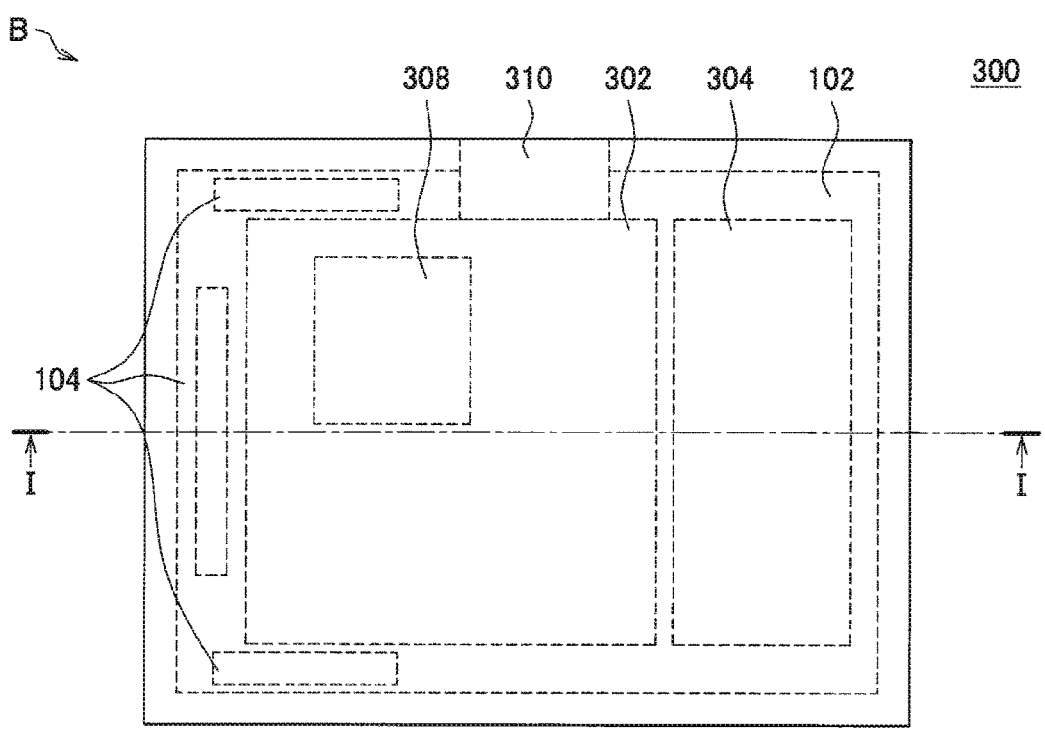

FIG. 4 is an explanatory diagram illustrating an example of the configuration of the antenna apparatus 300 according to the third embodiment. A in FIG. 4 illustrates an example of cross-section of the antenna apparatus 300, and B in FIG. 4 illustrates an example of arrangement of components in the case where the antenna apparatus 300 is viewed from one face (upper side in A in FIG. 4). Further, in A in FIG. 4, an object 500 to which the antenna apparatus 300 is loaded is also illustrated.

The antenna apparatus 300 includes, for example, an electronic circuit substrate 302, a battery 304, a display device 306, a system IC 308 and an input/output interface 310 as other components.

On the electronic circuit substrate 302, the system IC 308, various kinds of processing circuits, or the like, are implemented. The system IC 308 is configured with one or two or more processors, or the like.

The system IC 308, or the like, implemented on the electronic circuit substrate 302 perform, for example, processing on a signal received by the first antenna 104 and processing relating to transmission control of transmitting a signal from the first antenna 104. Further, the system IC 308, or the like, implemented on the electronic circuit substrate 302 perform various processing such as, for example, charging and discharging control at the battery 304, display control of a display screen of the display device 306 and control of communication with an external apparatus via the input/output interface 310. Further, for example, when the second antenna 106 is used for communication, the system IC 308, or the like, implemented on the electronic circuit substrate 302 may perform processing on a signal received by the second antenna 106, processing relating to transmission control of transmitting a signal from the second antenna 106, or the like.

Examples of the battery 304 can include a secondary battery such as a lithium-ion battery.

Examples of the display device 306 can include a liquid crystal display (hereinafter, referred to as an "LCD"), an organic electro-luminescence (EL) display, an organic light emitting diode display (OLED display), or the like.

Examples of the input/output interface 310 can include a universal serial bus (USB) terminal, a digital visual interface (DVI) terminal, a high-definition multimedia interface (HDMI) (registered trademark) terminal, various kinds of processing circuits, or the like.

Note that the configuration of the antenna apparatus according to the third embodiment is not limited to the configuration illustrated in FIG. 4.

Figure 5:
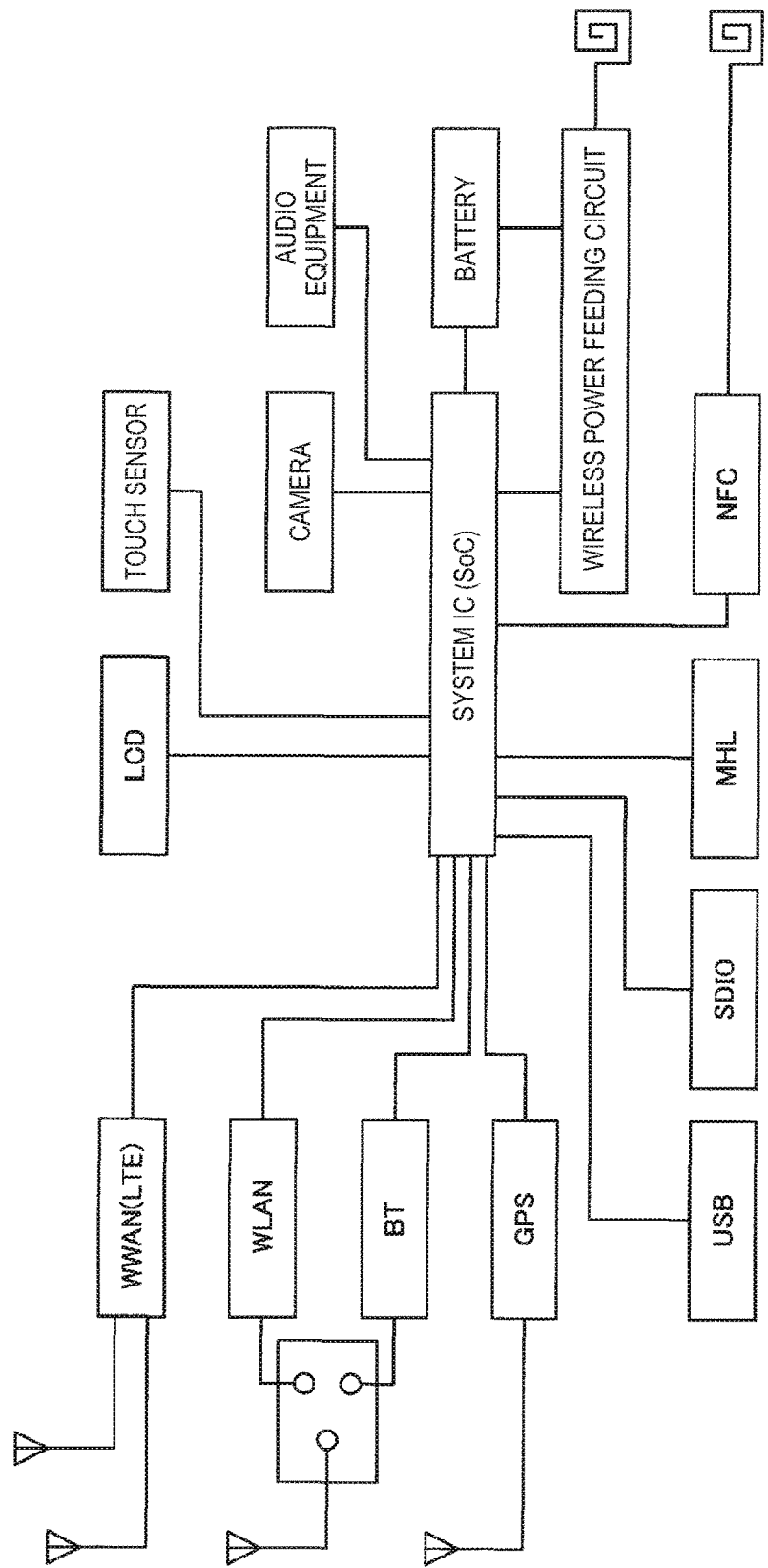
FIG. 5 is an explanatory diagram illustrating an example of a hardware configuration of the antenna apparatus according to the third embodiment.

FIG. 5 is an explanatory diagram illustrating an example of a hardware configuration of the antenna apparatus according to the third embodiment.

The antenna apparatus according to the third embodiment includes, for example, the following hardware. Note that it goes without saying that the hardware configuration of the antenna apparatus according to the third embodiment is not limited to the example described below.

- an IC having a processor, various kinds of processing circuits, a read only memory (ROM), a random access memory (RAM), a recording medium such as a flash memory, or the like (for example, a system IC illustrated in FIG. 5)
- an operation interface which allows the user to perform operation (for example, a touch sensor illustrated in FIG. 5)
- a display device displaying various screens on a display screen (for example, an LCD illustrated in FIG. 5)
- an input/output interface (for example, a USB and SDIO illustrated in FIG. 5)
- a communication interface (for example, WWAN (LTE), WLAN, BT, GPS, mobile high-definition link (MHL) (registered trademark), NFC and each antenna illustrated in FIG. 5)
- an imaging device such as a digital still camera and a digital video camera (for example, a camera illustrated in FIG. 5)
- a sound output device configured with a speaker, or the like (for example, audio equipment illustrated in FIG. 5)
- a power supply device (for example, a battery and a wireless power feeding circuit illustrated in FIG. 5)

While the antenna apparatus has been described above as the present embodiment, the present embodiment is not limited to this form. The present embodiment can be applied to an arbitrary wearable device such as, for example, a wristwatch-type wearable device used by being worn on the wrist or the arm, a glasses-type wearable device and a wearable device which can be used while being worn on an arbitrary portion such as the ankle and the waist. Further, the present embodiment can be applied to various equipment on which a communication function can be provided, such as, for example, an antenna apparatus such as a smartphone and a mobile phone, a tablet-type apparatus, a computer such as a PC, an image/music reproducing apparatus (or an image/music recording and reproducing apparatus), and game machine.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art based on the description of this specification.

Additionally, the present technology may also be configured as below.

(1)
An antenna apparatus including:
a magnetic sheet;
a first antenna provided on one face of the magnetic sheet and used for communication; and
a second antenna provided on the other face opposite to the one face of the magnetic sheet and used for wireless power transmission.

(2)
The antenna apparatus according to (1), further including:
a metal member provided on the one face of the magnetic sheet,
wherein the first antenna is provided on one face side of the magnetic sheet while being connected to the metal member, and
the metal member functions as a ground of the first antenna.

(3)
The antenna apparatus according to (2),
wherein the metal member has a comb-shaped structure, a meander-shaped structure, a slot-type structure or an island-shaped structure in which members are connected to each other with circuits.

(4)
The antenna apparatus according to any one of (1) to (3),
wherein the first antenna has a comb-shaped structure, a meander-shaped structure, a slot-type structure or an island-shaped structure in which members are connected to each other with circuits.

(5)
The antenna apparatus according to any one of (1) to (4),
wherein the second antenna is further used for communication.

(6)
The antenna apparatus according to any one of (1) to (6), further including:
a third antenna provided on the other face of the magnetic sheet and used for communication.

(7)
The antenna apparatus according to any one of (1) to (6),
wherein the antenna apparatus is a wearable device which is usable while being worn by a user, and
the other face of the magnetic sheet is a face on a user body side in the case where the antenna apparatus is worn by the user.

REFERENCE SIGNS LIST 100, 200, 300 antenna apparatus
102 magnetic sheet
104 first antenna
106 second antenna
202 metal member
302 electronic circuit substrate
304 battery
306 display device
308 system IC
310 input/output interface
500 object

The invention claimed is:
1. An antenna apparatus comprising:
a magnetic sheet;
a first antenna provided on one face of the magnetic sheet and used for communication, wherein the first antenna has a comb-shaped structure, a meander-shaped structure, a slot-type structure or an island-shaped structure, members of the island shaped structure being connected to each other with circuits; and a second antenna provided on the other face opposite to the one face of the magnetic sheet and used for wireless power transmission.

2. The antenna apparatus according to claim 1, further comprising:

a metal member provided on the one face of the magnetic sheet, wherein the first antenna is provided on one face side of the magnetic sheet while being connected to the metal member, and the metal member functions as a ground of the first antenna.

3. The antenna apparatus according to claim 2, wherein the metal member has a comb-shaped structure, a meander-shaped structure, a slot-type structure or an island-shaped structure, members of the island shaped structure being connected to each other with circuits.

4. The antenna apparatus according to claim 1, wherein the second antenna is further used for communication.

5. The antenna apparatus according to claim 1, further comprising:

a third antenna provided on the other face of the magnetic sheet and used for communication.

6. The antenna apparatus according to claim 1, wherein the antenna apparatus is a wearable device which is usable while being worn by a user, and the other face of the magnetic sheet is a face on a user body side in the case where the antenna apparatus is worn by the user.

* * * * *